United States Patent Office 3,409,644
Patented Nov. 5, 1968

3,409,644
BENZENESULFONYL UREAS
Gerhard Muller and Rudolf Merten, Leverkusen, and Sophie Wirtz, Wuppertal-Elberfeld, Germany, assignors to Farbwerke Hoechst Aktiengesellschaft vormals Meister Lucius & Bruning, Frankfurt am Main, Germany, a corporation of Germany
No Drawing. Filed June 24, 1965, Ser. No. 466,821
Claims priority, application Germany, June 30, 1964, F 43,301
7 Claims. (Cl. 260—397.7)

ABSTRACT OF THE DISCLOSURE

Benzenesulfonyl ureas, and physiologically tolerable salts thereof, having the formula

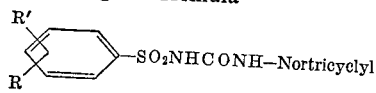

in which R is hydrogen, halogen, lower alkyl, lower alkoxy, acetyl, propionyl, benzoyl, halo-lower alkyl, amino-lower alkyl hydroxy-lower alkyl, lower alkenyl, halo-lower alkenyl, amino-lower alkenyl or hydroxy-lower alkenyl and R' is hydrogen, halogen, lower alkyl, lower alkoxy, acetyl, propionyl, benzoyl, halo-lower alkyl, amino-lower alkyl, hydroxy-lower alkyl, lower alkenyl, halo-lower alkenyl, amino-lower alkenyl, hydroxy-lower alkenyl, amino, acetyl-amino, propionylamino or benzoylamino. These compounds have hypoglycemic activity.

The present invention relates to benzenesulfonyl ureas of the general formula

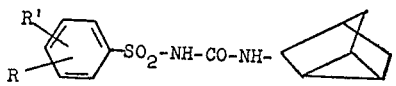

which as such or in the form of their salts possess hypoglycemic properties and, as regards activity, are far superior to the known N-(4-methyl-benzenesulfonyl)-N'-n-butyl-urea.

In the above formula R and R' represent hydrogen, halogen, alkoxy, acyl or an aliphatic saturated or unsaturated hydrocarbon radical which may be substituted by halogen, an amino group or a hydroxyl group. R may likewise stand for an amino group or an acylated amino group. In the case of R not representing an amino group or an acylated amino group, R and R' may be equal or different.

In the above and the following definitions, "alkyl" or "alkoxy" contain 1 to 4 carbon atoms in straight or branched chain. "Acyl" represents an acyl group (organic acid radical) with preferably up to 4 carbon atoms, in particular a straight-chained or branched alkanoyl radical of a corresponding length of chain.

R and R' may represent, for instance, methyl, ethyl, propyl, isopropyl, butyl, isobutyl, sec. butyl; radicals with one ethylenic double linkage, such as allyl or crotyl corresponding to the above-mentioned hydrocarbon radicals, furthermore alkyls with 1 to 4 carbon atoms carrying as substituents halogen such as fluorine, bromine or iodine or, preferably chlorine, for instance, chloromethyl, bromomethyl, β-chlorethyl, γ-chloropropyl. Finally, there are mentioned as examples for R and R' halogens such as fluorine, bromine, iodine or, preferably, chlorine, lower alkoxy groups such as methoxy, ethoxy, propoxy, isopropoxy, butoxy and acyl groups such as acetyl, propionyl, benzoyl. Furthermore, R may stand, for example, for aminomethyl, α-aminoethyl, β-aminoethyl, aminoalkyls with 3 or 4 carbon atoms as well as the hydroxy-alkyls corresponding to the above-mentioned aminoalkyls.

The present invention furthermore provides a process for preparing these benzensulfonyl-ureas or their salts. This process can be carried out by (a) reacting R, R'-substituted benzenesulfonyl-isocyanates, benzenesulfonyl-carbamic acid esters, benzenesulfonyl-thiocarbamic acid esters, benzenesulfonyl-carbamic acid halides or benzenesulfonyl-ureas with aminonortricyclene or its salts;
(b) reacting benzenesulfamides of the formula

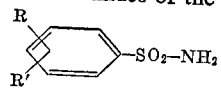

or—if desired—their salts with nortricyclyl-isocyanate, nortricyclyl-carbamic acid esters, nortricyclyl-thiocarbamic acid esters, nortricyclyl-carbamic acid halides or nortricyclyl-ureas.
(c) reacting alkali metal salts of R, R'-substituted benzenesulfonic acid halides with nortricyclyl-formamide;
(d) reacting correspondingly substituted benzenesulfonyl-halides with nortricyclyl-urea, nortricyclyl-isourea ethers, nortricyclyl-isothiourea ethers, nortricyclyl-guanidines or nortricyclyl-parabanic acid and hydrolising the benzenesulfonyl-isourea ethers, benzenesulfonyl-isothiourea ethers, benzenesulfonyl-guanidines or benzenesulfonyl-parabanic acids obtained by the above-described or any other method;
(e) replacing in correspondingly substituted benzenesulfonyl-thioureas the sulfur atom by an oxygen atom;
(f) oxidizing corresponding benzenesulfinyl-ureas or benzene sulfenyl-ureas and treating the products with alkaline agents if salt formation is desired.

According to the nature of the bridge members R and R', one or the other of the above-mentioned processes for the preparation of the individual compounds corresponding to the general formula will—in single cases—be less suitable or will at least require protective measures for the active groups. Said cases, which are comparatively rare, can easily be recognized by the expert and the application of another of the syntheses described above will be successful and will not give rise to any difficulties.

Instead of benzenesulfonyl-isocyanates there can likewise be used compounds which may be considered derivatives of said benzenesulfonyl-isocyanates. Derivatives of said isocyanates are likewise the so-called masked isocyanates. It is known that "masked" isocyanates comprise, for instance, the reaction products of isocyanates with components which may relatively easily be split off again, e.g. by the action of heat, for instance with phenols, bisulfite, malonic ester, ε-caprolactam, α-pyrrolidone or compounds containing active methylene groups. As examples for benezenesulfonyl-isocyanates be mentioned: benzenesulfonyl-isocyanate, 4-, 3- and 2-methyl-benzenesulfonyl-isocyanates, 4-ethylbenzenesulfonyl-isocyanate, 4-methoxy-benzenesulfonyl-isocyanate, 2-, 3- and 4-chlorobenzenesulfonyl - isocyanates, 4 - acetylbenzenesulfonyl - isocyanate.

Instead of nortricyclyl-isocyanate, it is generally also possible to utilize, in the same manner, compounds which react like nortricyclyl-isocyanate, in particular likewise so-called "masked" isocyanates.

A variation in the reaction of isocyanates with benzenesulfonamides is given by the reaction mentioned (sub c) in which by reaction of sulfonic acid halogen-amides with formamides, benzenesulfonamides and nortricyclyl-isocyanate are intermediarily formed. As benzenesulfonic acid halogen-amides there are particularly suitable in said reaction the bromides and chlorides.

The above-mentioned benzenesulfonyl-carbamic acid esters or the benzenesulfonyl-thiocarbamic acid esters may contain in the alcohol component a low-molecular alkyl group or a phenyl group. The same applies to the nortristance by oxidization, into oxygen. The following scheme shows an example for the conversion of a guanidine, for instance, by alkaline hydrolysis in order to obtain the desired sulfonyl-urea.

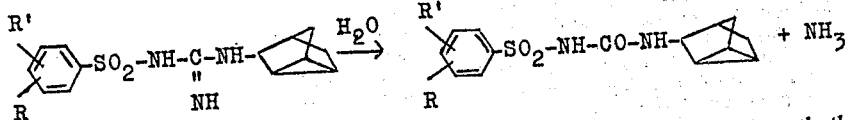

cyclyl-cambamic acid esters or the corresponding monothiocarbamic acid esters. In the sense of the invention there is to be understood by a low-molecular or a lower alkyl group in all cases an alkyl group containing not more than 4 carbon atoms. As examples for suitable benzenesulfonyl-carbamic acid esters or nortricyclyl-carbamic acid esters there are mentioned 4-methyl-benzenesulfonyl-methyl-urethane, 4-methoxy-benzenesulfonyl-methyl-urethane, 4-n-propoxy-benzenesulfonyl-methyl-urethane, N-nortricyclyl-carbamic acid methyl ester, N-nortricyclyl-carbamic acid isobutyl-ester and N-nortricyclyl-carbamic acid phenylester.

As carbamic acid halides, the chlorides are preferably suitable. There are mentioned, for instance, the 4-methyl-benzenesulfonyl-carbamic acid chloride and the 4-chloro-benzenesulfonyl-carbamic acid chloride.

The benzenesulfonyl-ureas used as starting substances for the process of the present invention may be unsubstituted at the side of the urea-molecule opposite to the sulfonyl group or may be mono- or disubstituted, preferably by lower alkyl groups or aryl groups. Instead of benzenesulfonyl-ureas substituted in the above-described manner there may likewise be used corresponding N-benzenesulfonyl-N'-acyl-ureas and bis-(benzenesulfonyl)-ureas. Thus is it possible, for instance, to treat bis-(benzene-sulfonyl)-ureas or N-benzenesulfonyl-N'-acyl-ureas with amino-nortricyclene and to heat the salts obtained to elevated temperatures, particularly above 100° C. As example of said ureas there are mentioned: 4-methyl-benzenesulfonyl-urea, 3-amino-4-methyl-benzene-sulfonyl-urea, N-(4-methyl-benzenesulfonyl)-N'-acetyl-urea, N-(4-methyl-benzenesulfonyl)-N'-propionyl-urea, N-(4-methyl-benzenesulfonyl)-N',N'-diphenyl-urea or N,N'-di(p-toluene-sulfonyl)-urea.

Furthermore, it is possible to start from N-nortricyclyl-ureas or N-nortricyclyl-N'-acyl-ureas wherein acyl preferably represents a low-molecular aliphatic or an aromatic acid radical or the nitro group, or from N-nortricyclyl-N'-phenyl-ureas or from N-nortricyclyl-N', N'-diphenyl-ureas in which the phenyl groups are substituted and linked together directly or by means of a bridge member such as —CH$_2$—, —NH—, —O— or —S—, or from N, N'-dinortricyclyl-urea and to react these with R,R'-substituted benzene-sulfonamides. As examples for said benezene-sulfonamides there are mentioned: benzene-sulfonic acid amide, 2-methyl-benzenesulfonic acid amide, 3-methyl-benzene-sulfonic acid amide, and 4-methyl-benzenesulfonic acid amide, 2-chlorobenzenesulfonic acid amide, 4-chlorobenzene-sulfonic acid amide, 4-acetyl- and amide, 3-amino-4-methyl-4-methoxy-benzenesulfonic acid amide, 4-(α-hydroxyethyl)-benzene-benzenesulfonic acid amide. As examples for suitable nortricyclyl-sulfonic acid amide. As examples for suitable nortricyclyl-ureas there are mentioned: N-nortricyclyl-N'-acetyl-urea, N-nortricyclyl-N'-propionyl-urea, N-nortricyclyl-N'-N'-diphenyl-urea.

As an example for the reaction mentioned (sub d) the reaction of a nortricyclyl-isourea-alkyl ether with a benzenesulfonic acid chloride is demonstrated. The benzene-sulfonyl-isourea ether can then be split into an alkylhalide and the desired benzenesulfonyl-urea by treatment with a hydrohalic acid. Other derivatives of carbonic acid can likewise be used as starting substances and an undesired radical present therein can hydrolytically be replaced by oxygen or can be converted by another operation, for in- The sulfur atom can be replaced by an oxygen atom in the correspondingly substituted benzenesulfonyl-thioureas for instance with the aid of oxides or salts of heavy metals or by applying oxidizing agents such as hydrogen-peroxide, sodium- peroxide or nitrous acid.

The thio-ureas can likewise be desulfurized by treating them with phosgene or phosphorus pentachloride. Chloroformic acid amidines or carbodiimides obtained as intermediate products can be converted by suitable measures such as hydrolysis or addition of water, into the benzene-sulfonyl-ureas.

In the same manner as the benzenesulfonyl-thioureas, the benzenesulfonyl-isothiourea-ethers which in the sense of the invention are equal to the benzenesulfonyl-thioureas, can be desulfurized.

Generally, the methods of realizing the process according to the invention may vary within wide limits as regards the reaction conditions and can be adapted to each individual case. For instance, the reactions can be carried out with the use of solvents, at room temperature or at an elevated temperature. As solvents there may be mentioned inert aromatic hydrocarbons such as toluene, xylene, chlorobenzene, dichlorobenzene, furthermore certain polar solvents such as dimethylformamide, dimethyl-sulfoxide, dioxide, acetone, furthermore glycolmonomethyl ethers or their mixtures. In order to obtain the compounds prepared according to the process of the present invention in a form as pure as possible they are suitably dissolved and reprecipitated. Thus the crude product can be dissolved in dilute ammonia, benzenesulfonamides formed in the course of the reaction are filtered off and the filtrate is acidified. The products of the invention can be recrystallized from appropriate solvents such as dilute alcohols.

The compounds obtained according to the process of the present invention are characterized by a strong hypoglycemic action. In order to examine the hypoglycemic action, a product obtained according to the present invention, viz. N-(4-methylbenzenesulfonyl)-N'-nortricyclyl-urea, was given to starved dogs with normal metabolism in the indicated dose in the form of a tragacanth suspension by means of the esophageal sound. Blood was first taken shortly before the application in order to determine the blood sugar value of the starved animal; further blood samples were taken each hour from the vein of the leg of the dogs. The blood-sugar values were determined according to the method of Hagedorn-Jensen.

In the following table the reductions of the blood sugar values are indicated in percent of the initial value and, for comparisoin, the reductions attained under equal test conditions with N-(4-methyl-benzenesulfonyl)-N'-n-butyl-urea are likewise indicated.

The products of the invention are to be used preferably as orally administerable preparations showing hypoglycemic action in the treatment of diabetes mellitus. They can be applied as such or in the form of their salts or in the presence of substances causing salt formation. For the salt-formation there can be used: alkali metals such as alkali metal hydroxides, alkaline earth metal hydroxides, alkali metal carbonates, alkaline earth metal carbonates, alkali metal bicarbonates, alkaline earth metal bicarbonates, ammonia, furthermore, physiologically tolerable organic bases. They are applied preferably in the form of tablets containing in addition to the products of the invention the usual auxiliary and carrier substances such as talc, starch, lactose, tragacanth, magnesium stearate.

Blood sugar reduction in starved dogs showing normal metabolism

| Animal Number | Administered preparation | Oral dose, mg./kg. | Value obtained with starved animal, mg. percent | Percent of reduction referred to the initial value after hours— | | | | | |
|---|---|---|---|---|---|---|---|---|---|
| | | | | 1 | 2 | 3 | 4 | 5 | 6 |
| 1 | N-(4-methylbenzene)-N'-nortricyclyl-urea | 5 | 91 | 19 | 19 | 23 | 23 | 18 | 19 |
| 2 | do | 5 | 88 | 20 | 26 | 30 | 26 | 22 | 18 |
| Average values | | | | (19.5) | (22.5) | (26.5) | (24.5) | (20) | (18.5) |
| 3 | N-(4-methylbenzene)-N'-nortricyclyl-urea | 2.5 | 90 | 17 | 26 | 29 | 22 | 9 | 8 |
| 4 | do | 2.5 | 90 | 20 | 24 | 26 | 19 | 10 | 10 |
| Average values | | | | (18.5) | (25) | (27.5) | (20.5) | (9.5) | (9) |
| 5 | N-(4-methylbenzene)-N'n-butyl-urea | 5 | 90 | 7 | 11 | 16 | 15 | 9 | 6 |
| 6 | do | 5 | 88 | 13 | 14 | 11 | 8 | 6 | 6 |
| Average values | | | | (10) | (12.5) | (13.5) | (11.5) | (7.5) | (6) |
| 7 | N-(4-methylbenzene)-N'n-butyl-urea | 2.5 | 90 | 9 | 14 | 12 | 11 | 7 | 9 |
| 8 | do | 2.5 | 91 | 3 | 11 | 9 | 8 | 5 | 5 |
| Average values | | | | (6) | (12.5) | (10.5) | (9.5) | (6) | (7) |

The following examples serve to illustrate the invention but are not intended to limit it thereto; the parts are by weight.

Example 1

To a solution of 67 parts of p-toluenesulfonic acid amide and 15.5 parts of sodium-hydroxide in 150 parts of water and 120 parts of acetone, 55 parts of norttricyclyl-isocyanate are added dropwise with cooling to +10° C. The reaction mixture is allowed to react for 3 hours at room temperature, it is filtered and the filtrate is acidified by means of acetic acid. A crystalline product is precipitated which is filtered with suction, washed with water and dried under reduced pressure. The N-(4-methyl-benzenesulfonyl)-N'-nortricyclyl-urea is obtained in a quantity of 101 grams. Melting point 200° C.

Example 2

To a solution of 30.5 parts of benzenesulfonic acid amide and 8 parts of sodium-hydroxide in 75 parts of water and 60 parts of acetone, 27.5 parts of nortricyclyl-isocyanate are added dropwise with cooling to +10° C. The reaction mixture is allowed further to react for 3 hours at room temperature, it is worked up as described in Example 1 and after recrystallization from n-propanol the N-benzenesulfonyl - N' - nortricyclyl-urea is obtained which melts at 228° C.

Example 3

To a solution of 41.5 parts of p-acetylamino-benzenesulfonic acid amide and 8 parts of sodium-hydroxide in 75 parts of water and 60 parts of acetone, 27.5 parts of nortricyclyl-isocyanate are added dropwise while cooling to +10° C. The mixture is allowed further to react for 3 hours at room temperature, it is worked up as described in Example 1 and the N-(p-acetyl-amino-benzenesulfonyl)-N'-nortricyclyl-urea is obtained in a quantity of 56 parts. Melting point 228° C. The reaction product is clearly soluble in dilute ammonia. 34 parts of the N - (p-acetylamino-benzenesulfonyl)-N'-nortricyclyl-urea are heated with 60 parts of 5 N-potassium hydroxide solution for 70 minutes in the water bath of 92° C., while stirring. A rigid crystalline cake is formed which is dissolved with 150 parts of water while being heated. The solution is shaken with charcoal and then filtered. The filtrate is adjusted to a pH-value of 5.2 to 50° C. by means of hydrochloric acid of 10% strength. A crystalline precipitate of N-(p-amino-benzenesulfonyl)-N'-nortricyclyl-urea is formed. Yield 24 parts. Melting point 204–206° C.

Example 4

To a solution of 39 parts of p-acetyl-benzenesulfonic acid amide and 8 parts of sodium-hydroxide in 125 parts of water and 100 parts of acetone, 27.5 parts of nortricyclyl-isocyanate are added dropwise while cooling to +10° C. The reaction is continued for a further 3 hours at room temperature, the substance is worked up as described in Example 1 and 20 parts of N-(p-acetyl-benzenesulfonyl) - N' - nortricyclyl-urea are obtained which melts at 168° C. and is clearly soluble in dilute ammonia.

We claim:

1. A benzenesulfonyl-urea of the formula

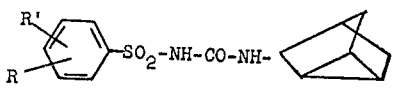

in which R is hydrogen, halogen, lower alkyl, lower alkoxy, acetyl, propionyl, benzoyl, halo-lower alkyl, amino-lower alkyl, hydroxy-lower alkyl, lower alkenyl, halo-lower alkenyl, amino-lower alkenyl or hydroxy-lower alkenyl and R' is hydrogen, halogen, lower alkyl, lower alkoxy, acetyl, propionyl, benzoyl, halo-lower alkyl, amino-lower alkyl, hydroxy-lower alkyl, lower alkenyl, halo-lower alkenyl, amino-lower alkenyl, hydroxy-lower alkenyl, amino, acetylamino, propionylamino or benzoylamino.

2. N-(4-methyl-benzene-sulfonyl)-N'-nortricyclyl-urea.
3. N-(4-chloro-benzene-sulfonyl)-N'-nortricyclyl-urea.
4. A physiologically tolerable salt with a base of a compound as claimed in claim 1.
5. N-benzenesulfonyl-N'-nortricyclyl urea.
6. N-(p-amino-benzenesulfonyl)-N'-nortricyclyl urea.
7. N-(p-acetyl-benzenesulfonyl)-N'-nortricyclyl urea.

References Cited

UNITED STATES PATENTS 3,096,372   7/1963   Gerzon _____ 260—553

JOHN D. RANDOLPH, *Primary Examiner.*